UNITED STATES PATENT OFFICE.

ALEXANDER WARNER, OF NEW YORK, N. Y.

PROCESS OF COVERING HAMS, &c.

SPECIFICATION forming part of Letters Patent No. 395,368, dated January 1, 1889.

Application filed February 9, 1888. Serial No. 241,203. (No specimens.)

*To all whom it may concern:*

Be it known that I, ALEXANDER WARNER, of the city and county of New York, in the State of New York, have invented a new and useful Improvement in Preservative Coverings for Hams and other Cured Articles of Animal Food, of which the following is a specification.

The invention consists in first applying, either directly to the surface of a ham or other cured article of animal food, or to a wrapper or envelope within which such article is inclosed, a paste of amylaceous matter or compound, and afterward producing the coagulation of said paste, by means hereinafter described, whereby I obtain a dense, strong, and smooth coating or covering, which preserves the meat or food from mold and atmospheric deterioration. To form this paste, pure starch may be used, or starch combined with other matter that will not be incompatible with its coagulation, or the flour of any cereals may be used mixed with a liquid menstruum to a proper consistence. For example, I will take, by weight, six parts of starch, three parts of uncrystallizable molasses or sirup, and three parts of water, mix them, and stir or work them into a smooth paste, which is at once ready for use. Water alone might, however, be used as the combining liquid or menstruum for the starch; but the addition of uncrystallizable molasses or sirup causes the coating after its coagulation to have a flexibility and freedom from liability to crack which it would not otherwise possess. Glycerine or glucose may be substituted for the molasses or sirup with a similar result.

The above formula for the paste is merely given as an example, and may be considerably varied, provided the paste contain amylaceous matter, a combining liquid or menstruum, and be susceptible of coagulation after it is applied.

The paste may be applied in different ways. It may be used either as a coating applied directly upon the surface of the article of food to be protected, or may be applied to the interior of a woven or other fabric which is to be used as a wrapper, or to the exterior of an envelope which contains the article to be preserved; but in every case, after the coating, wrapper, or envelope has been applied to the article to be preserved, the paste is coagulated by heat or equivalent agency.

The amylaceous coating or covering which has been in any way applied in the form of paste may then, by exposing it to a heat of 212° Fahrenheit, or subjecting it to the action of an alkaline solution, or by both of these means, be brought to a state of coagulation, which produces a radical change in its character, converting it into a tough skin-like integument, which is entirely impervious to atmospheric influence.

A very efficient mode of coagulating the amylaceous covering or coating is to immerse the paste-covered article in a solution of caustic soda of a strength of from 7° to 15° Baumé and at a temperature of from 180° Fahrenheit to the boiling-point, and allowing it to remain submerged therein from five to ten minutes, more or less, according to the strength and temperature of the solution. This treatment causes the coating or covering to contract tightly upon the article and, after exposure to the air for a few hours, to dry away the moisture from the coagulated material. The article will be so closely incased with the tough skin-like integument into which the amylaceous paste has been converted as to be thoroughly preserved from mold and atmospheric deterioration.

Heretofore bladder-shaped bags made of woven material have been treated with animal gelatine and starch paste while hot, and subsequently dipped in a cold saturated solution of common salt and alum to harden the paste. Such bags were required to be kept moist until used, and were then filled through a narrow neck with lard in a fluid state. They were not adapted to closely fit a solid article so as to exclude air, nor were they subjected to any treatment after the lard had been filled into them, such as claimed herein; and, furthermore, coagulation is not produced by the mode of procedure referred to, and I hereby disclaim the use of said solution in the preparation of my preservative coverings upon articles of food.

What I claim as my invention, and desire to secure by Letters Patent, is—

1. The within-described improvement in the art of applying preservative coverings to hams and other articles of food, consisting in first applying directly to the article a plastic composition containing amylaceous matter susceptible of coagulation, and afterward producing coagulation of said composition upon the article, substantially as set forth.

2. The process of producing preservative coverings upon hams and other articles of food, consisting in first applying closely to such article a binder or wrapper, in combination with a plastic composition containing amylaceous matter susceptible of coagulation, and afterward producing coagulation of said composition upon the articles, substantially as set forth.

3. The improvement in the art of applying preservative coverings to hams and other articles of food, consisting in applying thereto a coating of amylaceous matter with a wrapper, and subsequently immersing the so-coated article in a heated alkaline solution.

ALEXANDER WARNER.

Witnesses:
FREDK. HAYNES,
HENRY J. MCBRIDE.